United States Patent [19]  
Lienhard et al.

[11] Patent Number: 4,527,994  
[45] Date of Patent: Jul. 9, 1985

[54] PROCESS FOR MASS-COLORING NYLON WITH 1:2 CHROMIUM COMPLEX AZO DYE

[75] Inventors: Paul Lienhard, Frenkendorf; Werner Saar, Riehen, both of Switzerland

[73] Assignee: Ciba-Geigy Corporation, Ardsley, N.Y.

[21] Appl. No.: 630,466

[22] Filed: Jul. 12, 1984

[51] Int. Cl.³ .............................................. C09B 45/00
[52] U.S. Cl. ........................................... 8/494; 8/686; 8/690; 8/692; 8/924; 264/73; 264/75
[58] Field of Search ....................... 8/494, 686; 264/75

[56] References Cited

U.S. PATENT DOCUMENTS 3,565,880 2/1971 Jiron et al. .......................... 260/145
4,369,272 1/1983 Jaffe ..................................... 524/88

FOREIGN PATENT DOCUMENTS 1055281 1/1967 United Kingdom .
1399284 7/1975 United Kingdom .

Primary Examiner—A. Lionel Clingman  
Attorney, Agent, or Firm—Luther A. R. Hall

[57] ABSTRACT

Process for mass-coloring nylon in dark brown, dark violet and black shades, which comprises using as dye either mixtures of the 1:2 chromium complex of a monoazo dye of the formula I

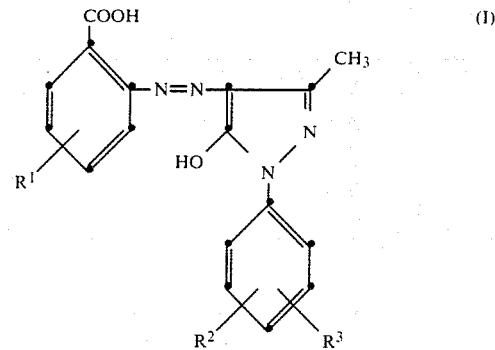

and the 1:2 chromium complex of a monoazo dye of the formula II

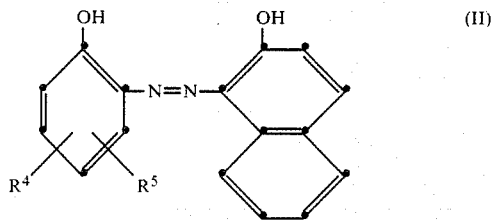

or a mixed 1:2 chromium complex of a monoazo dye each of the formula I and the formula II in which $R^1$, $R^2$, $R^3$, $R^4$ and $R^5$ are as defined in claim 1.

10 Claims, No Drawings

PROCESS FOR MASS-COLORING NYLON WITH 1:2 CHROMIUM COMPLEX AZO DYE

The present invention relates to a process for mass-colouring nylon and to the resulting coloured nylon material.

It is known that nylon can be mass-coloured in dark, especially black, shades by means of carbon black products of the type described in, for example, British Pat. No. 1,399,284, which, however, has the disadvantage that the carbon black—which is insoluble in the nylon melt—can clog up the packet of sieves upstream of the spinning jet and, moreover, causes abrasion on the spinning jet.

It is also known to use mixtures of yellow, red and blue polymer-soluble dyes, of which the blue component is usually an expensive anthraquinone derivative.

It is further known that certain, dark-shade metal complexes of azo compounds can be used. Examples thereof are the 1:2 chromium complexes of o-hydroxyazo dyes as described in, for example, British Pat. No. 1,055,281 or French Pat. No. 1,457,695. The properties of these dyes are frequently unsatisfactory. In particular, their heat stability leaves room for improvement.

It has now been found that certain 1:2 chromium complexes of a pyrazolone dye and a β-naphtholazo dye are particularly suitable for mass-colouring nylon in dark shades.

The invention accordingly provides a process for mass-colouring nylon which comprises using as dye either mixtures of the 1:2 chromium complex of a monoazo dye of the formula I

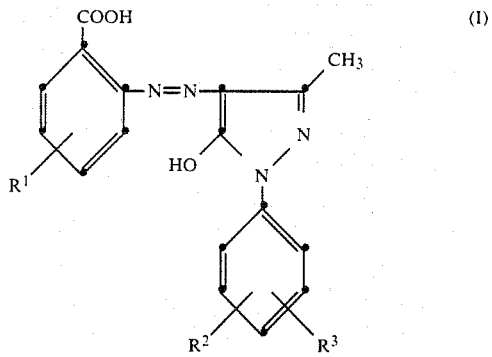

in which $R^1$ and $R^3$, independently of each other, are each —H or —Cl, and $R^2$ is —H, $C_1$–$C_4$-alkyl and/or —Cl, and the 1:2 chromium complexes of a monoazo dye of the formula II

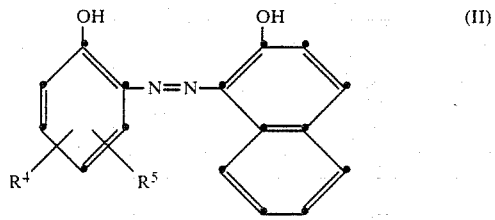

in which $R^4$ is —H or —Cl, and $R^5$ is —H, —Cl, —$CH_3$, $C_1$–$C_2$ alkylsulfonyl or —$SO_2NH_2$, or a mixed 1:2 chromium complex of a monoazo dye each of the formula I and the formula II in which $R^1$, $R^2$, $R^3$, $R^4$ and $R^5$ are as defined above.

A $C_1$–$C_4$-alkyl $R^2$ can be straight-chain or branched alkyl, for example methyl, ethyl, n-propyl, isopropyl, n-butyl, sec.-butyl and tert.-butyl, but in particular methyl.

In preferred dye mixtures of the 1:2 chromium complexes of a dye each of the formulae I and II, $R^1$, $R^3$ and $R^4$, independently of one another, are each —H or —Cl, $R^2$ is —H, —Cl or —$CH_3$, and $R^5$ is —H, —Cl, —$CH_3$ or —$SO_2NH_2$.

In particularly preferred dye mixtures of dyes of the formulae I and II, $R^1$, $R^2$ and $R^3$, independently of one another, are each —H or —Cl, and $R^4$ and $R^5$, independently of each other, are each —H, —Cl or —$CH_3$.

In very particularly preferred dye mixtures of the formulae I and II, $R^1$, $R^2$, $R^3$ and $R^4$ are each —H and $R^5$ is a chlorine atom in para-position relative to the HO group.

The dyes of the formulae I and II which are used are known compounds which are obtained by conventional diazotisation of an appropriate anthranilic acid and an aminophenol respectively and coupling the diazo compound thus obtained with an appropriate methylphenylpyrazolone and β-naphthol component respectively, and the azo dye thus obtained is metallised during its synthesis or preferably afterwards.

The 1:2 chromium complexes of the formulae I and II which are regarded as suitable according to the invention can be in the form of a salt, for example in the form of the sodium, potassium or ammonium salt, or in the form of free 1:2 chromium complexes.

Mixed 1:2 chromium complexes of a monoazo dye each of the formulae I and II can be prepared by customary methods, for example by reacting a chromium salt with a mixture of a compound of the formula I and a compound of the formula II.

Non-limiting examples of anthranilic acids and aminophenols which are required for synthesising the dyes of the formulae I and II are anthranilic acid, 2-amino-4-chlorobenzoic acid, 2-aminophenol, 2-amino-4-chlorophenol, 2-amino-4,6-dichlorophenol, 2-amino-4-methylphenol, 2-amino-4-methylsulfonylphenol, 2-amino-4-ethylsulfonylphenol and 2-amino-4-sulfamoylphenol.

Examples of methylphenylpyrazolone derivatives are
3-methyl-1-phenyl-2-pyrazolin-5-one,
3-methyl-1-(2'-chlorophenyl)-2-pyrazolin-5-one,
3-methyl-1-(3'-chlorophenyl)-2-pyrazolin-5-one,
3-methyl-1-(4'-chlorophenyl)-2-pyrazolin-5-one,
3-methyl-1-(2',5'-dichlorophenyl)-2-pyrazolin-5-one,
3-methyl-1-(2',4'-dichlorophenyl)-2-pyrazolin-5-one,
3-methyl-1-(3',4'-dichlorophenyl)-2-pyrazolin-5-one,
3-methyl-1-(4'-methylphenyl)-2-pyrazolin-5-one,
3-methyl-1-(3'-methylphenyl)-2-pyrazolin-5-one,
3-methyl-1-(2'-ethylphenyl)-2-pyrazolin-5-one,
3-methyl-1-(2',4'-dimethylphenyl)-2-pyrazolin-5-one,
3-methyl-1-(3',4'-dimethylphenyl)-2-pyrazolin-5-one,
3-methyl-1-(2'-methyl-5'-chlorophenyl)-2-pyrazolin-5-one,
3-methyl-1-(2'-methyl-3'-chlorophenyl)-2-pyrazolin-5-one and
3-methyl-1-(4'-tert.-butylphenyl)-2-pyrazolin-5-one.

The dyes of the formulae I and II can be used in the crude form in which they are obtained in the course of their synthesis. However, they can also be purified if necessary.

The dye mixtures used according to the invention contain between 10 and 50% by weight of the 1:2 chromium complex of a pyrazolone derivative of the formula I and 90 to 50% by weight of the 1:2 chromium complex of a naphthol derivative of the formula II, which concentration ratios can be varied to set dark shades, in particular dark brown, dark violet and especially black shades, in a simple manner.

Suitable nylons for the present process can be prepared, for example, from ε-caprolactam (Perlon ®, nylon 6), from ω-aminoundecanoic acid (Rilsan ®), from hexamethylenediamine and adipic acid (nylon 66), or from analogous starting materials. Also suitable are copolyamides, for example prepared from ω-caprolactam, hexamethylenediamine and adipic acid.

The dyes or dye mixtures used according to the invention are mixed, in line with known processes, in solid or liquid form or in the form of a solution with the nylon, and the resulting mixture may be subjected to intermediate drying.

Preferably, the nylon to be coloured is in the form of powder, grains or chips and is covered with the dry pulverulent dye mixture, i.e. mechanically mixed with this mixture in such a way that the surface of these particles is coated with a layer of the dye mixture. The dye mixture is advantageously in finely divided form. Instead of the pure dye mixture it is possible, in many cases, to use with advantage products which, in addition to the dye mixture, contain a thermostable carrier which is compatible with nylon, preferably a Ca or Mg salt of a higher fatty acid, for example of stearic acid or behenic acid, or polyethylene, polystyrene, polyamide, polyester or mixtures thereof. Such carriers are described for example in U.S. Pat. No. 4,093,584, U.S. Pat. No. 4,279,802, British Pat. No. 1,398,352 and Swiss Pat. No. 599,322. These products in granulate form can be mixed with the uncoloured nylon granules and be further processed.

The nylon particles containing the dye mixture or the dye preparation are melted, and the melt is conventionally spun into fibres or shaped by some other method, for example into film or other mouldings, for example engineering plastics.

The dye mixture, in particular the dye in the form of a preparation, can also be injected in solid or liquid form into the molten nylon upstream of the spinning jet, and the injected nylon is then spun or shaped.

The coloured molten nylon is distinguished by a low proportion of undissolved particles, so that the sieve packets have long operating lives without cleaning.

The invention can also be implemented by dyeing nylon chips with a dyebath in the form of an aqueous solution or dispersion which may be stabilised with a dispersant and which contains one of the 1:2 chromium complex mixtures according to the invention. To increase the rate of dyeing, additives, for example salts, such as ammonium acetate, sodium acetate or monosodium phosphate, or acids, such as formic acid, can also be added to the dyebath.

When they have been dyed by one of the methods given above, the chips are conventionally melted and shaped into fibres or filaments. Instead of shaping them into fibres or filaments it is also possible to use the coloured chips not only for manufacturing textile structures but also for producing coloured injection-moulding compositions or mouldings of any kind (engineering plastics) made of nylon.

The coloured articles advantageously contain 0.01 to 3% by weight, preferably 0.5 to 2% by weight, of a dye mixture of the 1:2 chromium complexes of dyes of the formulae I and II, according to the invention, which dye mixtures contain between 10 to 50% by weight of the 1:2 chromium complex of an azo dye of the formula I and 90 to 50% by weight of the 1:2 chromium complex of an azo dye of the formula II.

In addition to the dye mixtures according to the invention, it is also possible to use further polymer-soluble chromium complex dyes, in particular for shading purposes. To adjust certain hues and depths of shade, these dye mixtures can be dissolved in a polar solvent such as dimethylformamide and be colorimetrically checked. This possibility does not exist with pigmentlike colorants such as carbon black.

The products are homogeneously coloured articles which are distinguished by high light, shampoo, wet, rubbing and in particular heat stability, fastness to dry cleaning, and, as the case may be, high IR reflectance and very good textile properties, such as tensile strength and stretch, or in the case of mouldings by good dimensional stability.

The dyes considered according to the invention are homogeneously and finely distributed in the coloured material by virtue of the fact that they are readily soluble and distributable in the nylon melt. Although not readily soluble in organic solvents such as chlorinated hydrocarbons, lower ketones, esters and alcohols, they are frequently present in dissolved form in the nylon.

In the following examples the parts and percentages are by weight unless otherwise stated, and the temperatures are given in degrees centigrade.

EXAMPLE 1

970 parts of nylon 6 are dry-coated in granulate form with 7.5 parts of the 1:2 chromium complex of the dye of the formula (1)

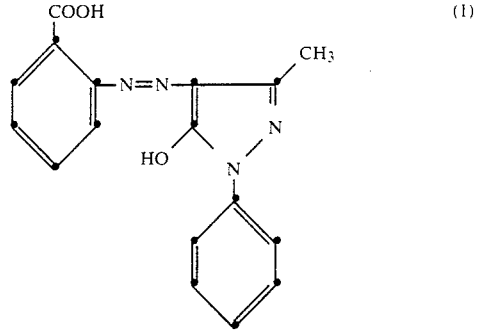

and 22.5 parts of the 1:2 chromium complex of the dye of the formula (2)

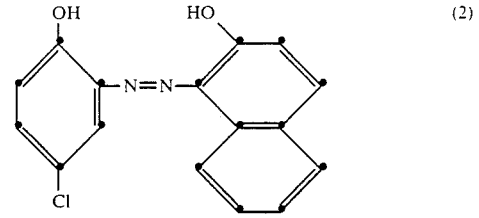

The polymer thus treated is extruded at 280°–295° C. in the form of a black fibre material which is distinguished by high light and wet fastness properties.

The example is repeated, except that 3 parts and 15 parts respectively of the chromium complex of the dye of the formula (1) are used in place of the 7.5 parts, and 27 parts and 15 parts respectively of the chromium complex of the dye of the formula (2) are used in place of the 22.5 parts, affording violet-black and brownish black nylon fibres respectively having likewise very good fastness properties.

EXAMPLE 2

5 parts of the 1:2 Cr complex of the dye of the formula (1) as in Example 1 and 15 parts of the 1:2 Cr complex of the dye of the formula (2) as in Example 1 are suspended in 2000 parts by volume of warm water, 5 parts of 85% formic acid and 1000 parts of nylon 6 granules are added, and the mixture is heated to the boil with stirring. This mixture is boiled for 2 hours and then filtered, and the coloured granules thus obtained are thoroughly washed with water and dried at 80° C. in vacuo. The granules are spun at 270°–275° C. on a conventional melt-spinning apparatus. This produces black textile filaments having very good light, shampoo, rubbing, dry-cleaning and dry-heat fastness.

EXAMPLE 3

50 parts of a dye preparation in granulate form comprising 8% of the chromium complex of the azo dye of the formula (1) as in Example 1, 32% of the chromium complex of the azo dye of the formula (2) as in Example 1 and 60% of a linear copolyester—Dynapol L 206 ®—from Dynamit Nobel AG—of terephthalic acid, isophthalic acid, ethylene glycol and neopentyl glycol, are mixed with 950 parts of nylon 6 granules and are extruded at 280°–285° C. The resulting filament has a uniform black colour with very high light, washing, water and perspiration fastness properties.

EXAMPLE 4

20 parts of a dye preparation in granulate form comprising 15% by weight of the 1:2 chromium complex of the azo dye of the formula (1) as in Example 1, 35% by weight of the 1:2 chromium complex of the azo dye of the formula (2) as in Example 1 and 50% by weight of magnesium behenate, are mixed with 980 parts of nylon 6 granules and extruded at 280°–285° C. This produces uniformly grey fibres having high fastness properties, in particular light and wet fastness properties.

EXAMPLE 5

Example 1 is repeated, except that the 1:2 Cr complexes of dyes A and B given in columns 2 and 3 of Table 1 are used in place of the 1:2 Cr complexes of the dyes of the formulae (1) and (2) as in Example 1, affording likewise very fast black colourings.

TABLE 1

| Example No. | 1:2 Cr complex of dye A | 1:2 Cr complex of dye B |
|---|---|---|
| 5 | 2-aminobenzoic acid → 1-(2'-chlorophenyl)-3-methylpyrazolin-5-one | 2-amino-4-chlorophenol → 2-naphthol |
| 6 | 2-aminobenzoic acid → 1-(2',5'-dichlorophenyl)-3-methylpyrazolin-5-one | 2-amino-4-chlorophenol → 2-naphthol |
| 7 | 2-aminobenzoic acid → 1-(2'-ethylphenyl)-3-methylpyrazolin-5-one | 2-amino-4-chlorophenol → 2-naphthol |
| 8 | 2-amino-4-chlorobenzoic acid → 1-phenyl-3-methylpyrazolin-5-one | 2-amino-4-chlorophenol → 2-naphthol |
| 9 | 2-aminobenzoic acid → 1-phenyl-3-methylpyrazolin-5-one | 2-amino-4-methylsulfonylphenol → 2-naphthol |
| 10 | 2-aminobenzoic acid → 1-phenyl-3-methylpyrazolin-5-one | 2-amino-4-sulfamoylphenol → 2-naphthol |
| 11 | 2-aminobenzoic acid → 1-phenyl-3-methylpyrazolin-5-one | 2-amino-4-methylphenol → 2-naphthol |
| 12 | 2-aminobenzoic acid → 1-phenyl-3-methylpyrazolin-5-one | 2-amino-4,6-dichlorophenol → 2-naphthol |
| 13 | 2-aminobenzoic acid → 1-phenyl-3-methylpyrazolin-5-one | 2-aminophenol → 2-naphthol |
| 14 | 2-aminobenzoic acid → 1-phenyl-2-methylpyrazolin-5-one | 2-amino-4-ethylsulfonylphenol → 2-naphthol |
| 15 | 2-aminobenzoic acid → 1-(4'-tert.-butylphenyl)-3-methyl-pyrazolin-5-one | 2-amino-4-chlorophenol → 2-naphthol |

EXAMPLE 6

19.3 parts of dye of the formula (1) as in Example 1, 26.9 parts of dye of the formula (2) as in Example 1 and 42 parts of $CrCl_3 \times 6H_2O$ are suspended in 600 parts by volume of n-butanol, and the suspension is heated and boiled (the water being liberated (being separated off) until all of the dyes have reacted (check by thin layer chromatography). The temperature is allowed to fall to 80° C., a further 44.8 parts of dye of the formula (2) as in Example 1 are added to the reaction mixture together with 7.5 parts by volume of water and 44.4 parts of sodium carbonate, and the batch is boiled as before until the new portion of dye has been completely metallised as well. The hot suspension is filtered, the residue is washed with n-butanol, the filtrate is evaporated to dryness, and the product thus obtained is dried to constant weight in vacuo at 100°–110° C. The product is a mixture of the asymmetrical complex of formula (III) below and of the two symmetrical 1:2 Cr complexes of the dye of the formula (1) and the dye of the formula (2) as in Example 1, in the form of a powder:

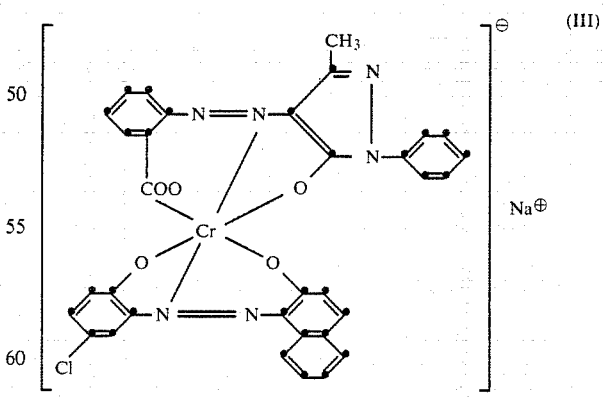

20 parts of the dye mixture thus obtained are thoroughly mixed with 980 parts of nylon 6 granules and extruded at 270°–280° C. This produces uniformly black fibres having very good fastness properties, in particular rubbing, light and dry-heat fastness properties. The dyes are dissolved in the polymer.

We claim:

1. A process for mass-colouring nylon which comprises using as dye either mixtures of the 1:2 chromium complex of a monoazo dye of the formula I

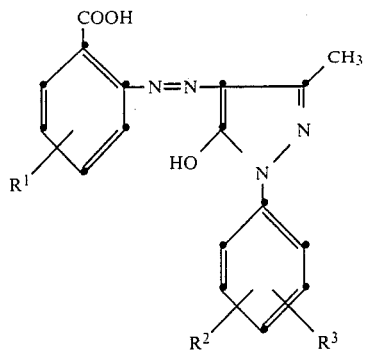

in which $R^1$ and $R^3$, independently of each other, are each —H or —Cl, and $R^2$ is —H, $C_1$-$C_4$-alkyl and/or —Cl, and the 1:2 chromium complexes of a monoazo dye of the formula II

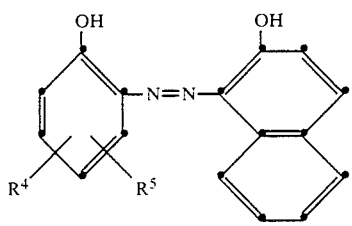

in which $R^4$ is —H or —Cl, and $R^5$ is —H, —Cl, —$CH_3$, $C_1$-$C_2$-alkylsulfonyl or —$SO_2NH_2$, or a mixed 1:2 chromium complex of a monoazo dye each of the formula I and the formula II in which $R^1$, $R^2$, $R^3$, $R^4$ and $R^5$ are as defined above.

2. A process according to claim 1, wherein, in the formulae I and II, $R^1$, $R^3$ and $R^4$, independently of each other, are each —H or —Cl, $R^2$ is —H, —Cl or —$CH_3$, and $R^5$ is —H, —Cl, —$CH_3$ or —$SO_2NH_2$.

3. A process according to claim 1, wherein, in the formulae I and II, $R^1$, $R^2$ and $R^3$, independently of one another, are each —H or —Cl, and $R^4$ and $R^5$, independently of each other, are each —H, —Cl or —$CH_3$.

4. A process according to claim 1, wherein, in the formulae I and II, $R^1$, $R^2$, $R^3$ and $R^4$ are each —H, and $R_5$ is a chlorine atom in para-position relative to the HO group.

5. A process according to claim 1, wherein 0.01 to 3% by weight of the nylon to be coloured is used of a dye mixture of the 1:2 chromium complexes of the azo dyes of the formulae I and II.

6. A process according to claim 1, wherein the dye mixtures contain between 10 to 50% by weight of the 1:2 chromium complex of an azo dye of the formula I and 90 to 50% by weight of the 1:2 chromium complex of an azo dye of the formula II.

7. A process according to claim 1, wherein further polymer-soluble chromium complex dyes are used in addition.

8. A process according to claim 1, wherein the nylon containing the dyes or dye mixtures is melted and the melt is spun or shaped using known methods.

9. A process according to claim 1, for obtaining black shades.

10. The nylon material coloured according to claim 1.

* * * * *